United States Patent
Talmor et al.

[11] Patent Number: 5,913,196
[45] Date of Patent: Jun. 15, 1999

[54] SYSTEM AND METHOD FOR ESTABLISHING IDENTITY OF A SPEAKER

[76] Inventors: Rita Talmor; Eli Talmor, both of 15/5 Alter Street Ramat-Alon, 32984 Haifa, Israel

[21] Appl. No.: 08/971,552

[22] Filed: Nov. 17, 1997

[51] Int. Cl.⁶ .............................. G10L 5/06; H04M 11/04
[52] U.S. Cl. ............................................ 704/270; 704/273
[58] Field of Search .................................. 704/231, 237, 704/243, 246, 270, 273, 274

[56] References Cited

U.S. PATENT DOCUMENTS

| | | |
|---|---|---|
| 3,991,271 | 11/1976 | Branscome et al. . |
| 4,013,837 | 3/1977 | Branscome et al. . |
| 4,020,285 | 4/1977 | Branscome et al. . |
| 4,100,370 | 7/1978 | Suzuki et al. . |
| 4,468,204 | 8/1984 | Scott et al. . |
| 4,534,056 | 8/1985 | Feilchenfeld et al. . |
| 4,590,604 | 5/1986 | Feilchenfeld . |
| 4,797,672 | 1/1989 | Kousa . |
| 4,821,027 | 4/1989 | Mallory et al. . |
| 4,864,642 | 9/1989 | Ueno et al. . |
| 4,865,072 | 9/1989 | Logsdon . |
| 5,023,901 | 6/1991 | Sloan et al. . |
| 5,054,083 | 10/1991 | Naik et al. . |
| 5,127,043 | 6/1992 | Hunt et al. . |
| 5,142,565 | 8/1992 | Ruddle . |
| 5,216,720 | 6/1993 | Naik et al. . |
| 5,245,694 | 9/1993 | Zwern . |
| 5,265,191 | 11/1993 | McNair . |
| 5,297,194 | 3/1994 | Hunt et al. . |
| 5,365,574 | 11/1994 | Hunt et al. . |
| 5,414,755 | 5/1995 | Bahler et al. . |
| 5,461,697 | 10/1995 | Nishimura et al. . |
| 5,499,288 | 3/1996 | Hunt et al. . |
| 5,502,759 | 3/1996 | Cheng et al. . |
| 5,623,539 | 4/1997 | Bassenyemukasa et al. ........... 704/273 |
| 5,625,747 | 4/1997 | Goldberg et al. . |
| 5,666,466 | 9/1997 | Lin et al. . |
| 5,774,525 | 6/1998 | Kanevsky et al. ....................... 704/273 |
| 5,774,858 | 6/1998 | Taubkin et al. .......................... 704/273 |

OTHER PUBLICATIONS

Atal, B.S., "Automatic Recognition of Speakers From Their Voices", *Proc. IEEE*, vol. 64, pp. 460–475, 1976.

Furui, S., "Speaker–Dependent–Feature extraction, Recognition and Processing Techniques", *Speech Communication*, 10: 505–520, 1991.

Gauvain, et al, "Speaker Identification and Verification", *LIMSI 1995 Scientific Report*, Mar., 1995.

Beek et al., "Speaker Authentication and Voice Data Entry," 21st Midwest Symposium on Circuits and Systems, Ames, IA, Aug. 14, 1978, pp. 266 to 273.

*Primary Examiner*—David R. Hudspeth
*Assistant Examiner*—Martin Lerner
*Attorney, Agent, or Firm*—Mark M. Friedman

[57] ABSTRACT

A system for establishing an identity of a speaker including a computerized system which includes at least two voice authentication algorithms. Each of the at least two voice authentication algorithms is different from one another and serves for independently analyzing a voice of the speaker for obtaining an independent positive or negative authentication of the voice by each of the algorithms. If every one of the algorithms provide positive authentication, the speaker is positively identified, whereas, if at least one of the algorithms provides negative authentication, the speaker is negatively identified.

24 Claims, 3 Drawing Sheets

SYSTEM AND METHOD FOR ESTABLISHING IDENTITY OF A SPEAKER

FIELD AND BACKGROUND OF THE INVENTION

The present invention relates to a system and method for establishing a positive or negative identity of a speaker and, more particularly, to a system and method which employ at least two independent and different voice authentication algorithms for establishing such identity.

There are a large number of applications in which frequent access of users into a system having high security requirements is involved. Such applications include, but are not limited to, financial services such as stock trade confirmation and implementation, bank account inquires and wire fund transfers, Internet based electronic commerce, computer networks, safes, homes, doors, elevators, cars and other high-value installations, all are referred to herein in the specification and claims section below as "secured-system(s)".

Currently available physical token authentication devices which are frequently used for identifying an individual, such as crypto cards or limited access cards, has a problem of low security protection, since such cards can be lost, stolen, loaned to an unauthorized individual and/or duplicated.

Another and more sophisticated approach for authentication, which is used to provide higher security protection, is known in the art as biometric authentication. Biometric authentication involves identification via authentication of unique body characteristics, such as, fingerprints, retinal scans, facial recognition and voice pattern authentication.

Please note that, as used herein and in the art of voice analysis, voice pattern authentication differs from voice pattern recognition. In voice pattern recognition the speaker utters a phrase (e.g., a word) and the system determines the spoken word by selecting from a pre-defined vocabulary. Therefore voice recognition provides for the ability to recognize a spoken phrase and not the identity of the speaker.

Retinal scanning is based on the fact that retinal blood vessel patterns are unique and do not change over lifetime. Although this feature provides high degree of security, retinal scanning has limitations since it is expensive and requires complicated hardware and software for implementation.

Finger printing and facial recognition also requires expensive and complicated hardware and software for implementation.

Voice verification, which is also known as voice authentication, voice pattern authentication, speaker identity verification and voice print, is used to provide the speaker identification. The terms voice verification and voice authentication are interchangeably used hereinbelow. Techniques of voice verification have been extensively described in U.S. Pat. Nos. 5,502,759; 5,499,288; 5,414,755; 5,365,574; 5,297,194; 5,216,720; 5,142,565; 5,127,043; 5,054,083; 5,023,901; 4,468,204 and 4,100,370, all of which are incorporated by reference as if fully set forth herein. These patents describe numerous methods for voice verification.

Voice authentication seeks to identify the speaker based solely on the spoken utterance. For example, a speaker's presumed identity may be verified using a feature extraction and pattern matching algorithms, wherein pattern matching is performed between features of a digitized incoming voice print and those of previously stored reference samples. Features used for speech processing involve, for example, pitch frequency, power spectrum values, spectrum coefficients and linear predictive coding, see B. S. Atal (1976) Automatic recognition of speakers from their voice. Proc. IEEE, Vol. 64, pp. 460–475, which is incorporated by reference as if fully set forth herein.

Alternative techniques for voice identification include, but are not limited to, neural network processing, comparison of a voice pattern with a reference set, password verification using, selectively adjustable signal thresholds, and simultaneous voice recognition and verification.

State-of-the-art feature classification techniques are described in S. Furui (1991) Speaker dependent—feature extraction, recognition and processing techniques. Speech communications, Vol. 10, pp. 505–520, which is incorporated by reference as if fully set forth herein.

Text-dependent speaker recognition methods rely on analysis of predetermined utterance, whereas text-independent methods do not rely on any specific spoken text. In both case, however, a classifier produces the speaker's representing metrics which is thereafter compared with a preselected threshold. If the speaker's representing metrics falls below the threshold the speaker identity is confirmed and if not, the speaker is declared an impostor.

The relatively low performance of voice verification technology has been one main reason for its cautious entry into the marketplace. The "Equal Error Rate" (EER) is a calculation algorithm which involves two parameters: false acceptance (wrong access grant) and false rejection (allowed access denial), both varying according the degree of secured access required, however, as shown below, exhibit a tradeoff therebetween. State-of-the-art voice verification algorithms (either text-dependent or text-independent) have EER values of about 2%.

By varying the threshold for false rejection errors, false acceptance errors are changing as graphically depicted in FIG. 1 of J. Guavain, L. Lamel and B. Prouts (March, 1995) LIMSI 1995 scientific report, which is incorporated by reference as if fully set forth herein. In this Figure presented are five plots which correlate between false rejection rates (abscissa) and the resulting false acceptance rates for voice verification algorithms characterized by EER values of 9.0%, 8.3%, 5.1%, 4.4% and 3.5%. As mentioned above there is a tradeoff between false rejection and false acceptance rates, which renders all plots hyperbolic, wherein plots associated with lower EER values fall closer to the axes.

Thus, by setting the system for too low false rejection rate, the rate of false acceptance becomes too high and vice versa.

Various techniques for voice-based security systems are described in U.S. Pat. Nos. 5,265,191; 5,245,694; 4,864,642; 4,865,072; 4,821,027; 4,797,672; 4,590,604; 4,534,056; 4,020,285; 4,013,837; 3,991,271; all of which are incorporated by reference as if fully set forth herein. These patents describe implementation of various voice-security systems for different applications, such as telephone networks, computer networks, cars and elevators.

However, none of these techniques provides the required level of performance, since when a low rate of false rejection is set, the rate of false acceptance becomes unacceptably high and vice versa.

It has been proposed that speaker verification must have false rejection in the range of 1% and false acceptance in the range of 0.1% in order to be accepted in the market.

There is thus a widely recognized need for, and it would be highly advantageous to have a more reliable and secured voice authentication system, having improved false acceptance and rejection rates.

SUMMARY OF THE INVENTION

According to the present invention there is provided a system and method for establishing an identity of a speaker via at least two different voice authentication algorithms.

According to further features in preferred embodiments of the invention described below, the method comprising the steps of (a) providing a computerized system employing at least two voice authentication algorithms, each of the at least two voice authentication algorithms being different from one another; and (b) independently analyzing a voice of the speaker by each of the at least two voice authentication algorithms for obtaining an independent positive or negative authentication of the voice by each of the at least two algorithms; wherein if every one of the at least two voice authentication algorithms provide a positive authentication, the speaker is positively identified, whereas, if at least one of the at least two voice authentication algorithms provides negative authentication, the speaker is negatively identified.

According to further features in preferred embodiments of the invention described below, the system comprising a computerized system including at least two voice authentication algorithms, each of the at least two voice authentication algorithms being different from one another and serving for independently analyzing a voice of the speaker for obtaining an independent positive or negative authentication of the voice by each of the at least two algorithms, wherein if every one of the at least two voice authentication algorithms provide a positive authentication, the speaker is positively identified, whereas, if at least one of the at least two voice authentication algorithms provides negative authentication, the speaker is negatively identified.

According to still further features in the described preferred embodiments each of the voice authentication algorithms is independently selected from the group consisting of text-dependent algorithms and text-independent algorithms.

According to still further features in the described preferred embodiments each of the voice authentication algorithms is independently selected from the group consisting of feature extraction followed by pattern matching algorithms, neural network voice authentication algorithms, Dynamic Time Warping (DTW) algorithm, Hidden Markov Model (HMM) algorithm and vector quantization (VQ) algorithm.

According to still further features in the described preferred embodiments a false rejection threshold of each of the at least two algorithms is set to a level below 0.5%.

According to still further features in the described preferred embodiments the false rejection threshold of each of the at least two algorithms is set to about 0.3% or 0.1%.

According to still further features in the described preferred embodiments the voice of the speaker is accepted for analysis by the computerized system via a remote communication mode.

According to still further features in the described preferred embodiments the remote communication mode is selected from the group consisting of wire telephone communication, cellular telephone communication, computer phone communication (e.g., Internet), and radio communication.

According to still further features in the described preferred embodiments the computerized system includes at least two hardware installations, each of the at least two hardware installations serves for actuating one of the at least two voice authentication algorithms.

According to still further features in the described preferred embodiments the at least two hardware installations are remote from one another.

According to still further features in the described preferred embodiments at least one of the at least two hardware installations is implemented in a secured-system, and at least another one of the at least two hardware installations is implemented in a securing-center, the at least one hardware installation implemented in the securing-center communicates with the at least one hardware installation implemented in the secured-system, such that all positive or negative identification data is established in the secured-system.

According to still further features in the described preferred embodiments the computerized system further includes a voice recognition algorithm for recognizing verbal data spoken by the speaker for positively or negatively recognizing the verbal data, and if the positive identity has been established, positively or negatively correlating between at least some of the verbal data and the speaker.

According to still further features in the described preferred embodiments the verbal data includes a spoken phrase selected from the group consisting of a name, an identification number, and a request.

According to still further features in the described preferred embodiments the at least two voice authentication algorithms include a first voice authentication algorithm and a plurality of identical second voice authentication algorithms, the first voice authentication algorithm is implemented in a security-center, whereas the plurality of second voice authentication algorithms are implemented in a plurality of secured-systems, the security-center communicates with each of the plurality of secured-systems.

The present invention successfully addresses the shortcomings of the presently known configurations by using at least two different voice authentication algorithms in synergism for more reliable and more efficient voice authentication.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of a system and method for establishing a positive or negative identity of a speaker which employ at least two different voice authentication devices and which can be used for supervising a controlled access into a secured-system. Specifically, the present invention can be used to provide voice authentication characterized by exceptionally low false-acceptance and low false-rejection rates.

As used herein the term "secured-system" refers to any system, device, etc., which allows access or use for authorized individuals only, which are to be positively authenticated or identified each time one of them seeks access or use of the system or device. Few examples of secured-systems are given in the Background section above.

The principles and operation of a system and method for voice authentication according to the present invention may be better understood with reference to the drawings and accompanying descriptions.

Figure 1:
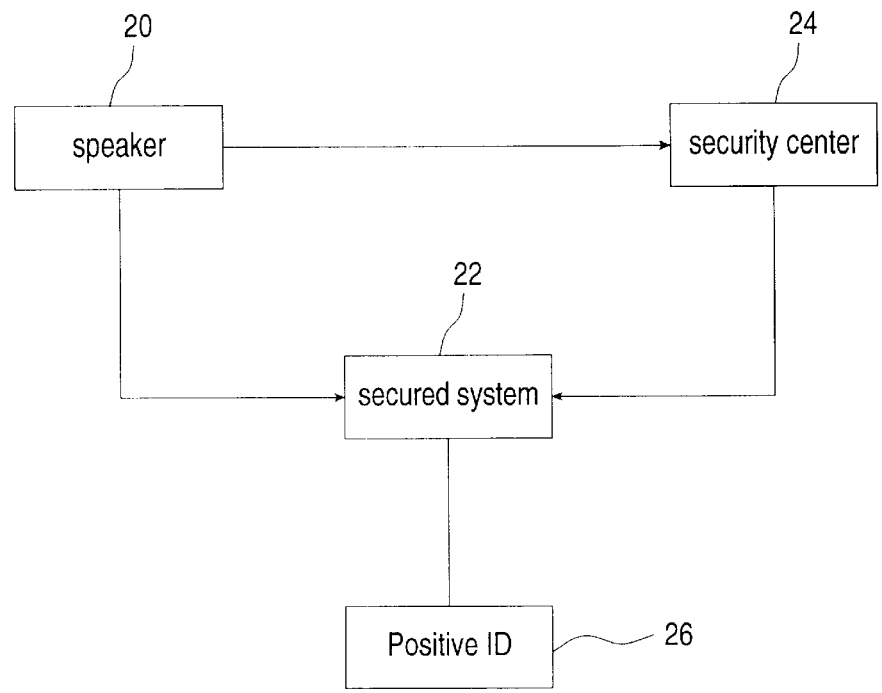
FIG. 1 is a block diagram demonstrating a prior art voice authentication secured-system access control concept.

Referring now to the drawings, FIG. 1 illustrates the basic concept of a prior art voice authentication system used for controlling an access to a secured-system.

A speaker, 20, communicates, either simultaneously or sequentially, with a secured-system 22 and a security-center 24. The voice of speaker 20 is analyzed for authentication by security-center 24, and if authentication is positively established by security-center 24, a communication command is transmitted therefrom to secured-system 22, positive identification (ID) of speaker 20, as indicated by 26, is established, and access of speaker 20 to secured-system 22 is allowed.

The prior art system of FIG. 1 employs a single voice authentication algorithm. As such, this system suffers the above described tradeoff between false-acceptance and false-rejection rates, resulting in too high false-acceptance and/or too high false-rejection rates, which render the system non-secured and/or non-efficient, respectively.

The present invention is a system and method for establishing an identity of a speaker via at least two different voice authentication algorithms. Selecting the voice authentication algorithms significantly different from one another (e.g., text-dependent and text-independent algorithms) ensures that the algorithms are statistically not fully correlated with one another, with respect to false-acceptance and false-rejection events, i.e., r<1.0, wherein "r" is a statistical correlation coefficient.

Assume that two different voice authentication algorithms are completely decorrelated (i.e., r=0) and that the false rejection threshold of each of the algorithms is set to a low value, say 0.5%, then, according to the tradeoff rule, and as predicted by FIG. 1 of J. Guavain, L. Lamel and B. Prouts (March, 1995) LIMSI 1995 scientific report the false acceptance rate for each of the algorithms is expected to be exceptionally high, in the order of 8% in this case.

However, if positive identity is established only if both algorithms positively authenticate the speaker, then the combined false acceptance is expected to be $(8\%)^2$, or 0.6%, whereas the combined false rejection is expected to be $0.5\% \times 2$, or 1%.

The expected value of the combined false acceptance is expected to increase and the expected value of the false rejection is expected to decrease as the degree of correlation between the algorithms increases, such that if full correlation is experienced (i.e., r=1.0), the combined values of the example given are reset at 0.5% and 8%.

Please note that the best EER value characterized the algorithms employed by B. Prouts was 3.5%. Extrapolating the plots of B. Prouts to similarly represent an algorithm with EER value of 2% (which is, at present, the state-of-the-art) one may choose to set false rejection at 0.3%, then false acceptance falls in the order of 4.6%, to obtain a combined false acceptance of 0.2% and a combined false rejection of 0.6%.

Thus, the concept of "different algorithms" as used herein in the specification and in the claims section below refers to algorithms having a correlation of r<1.0, preferably r<about 0.9, more preferably r<about 0.8, most preferably r<about 0.7, very most preferably r<about 0.6, best is if r ranges between about 0.0 and about 0.5, ultimately, r ranges between 0.0 and 0.2. For example, a text-dependent algorithm known as Dynamic Time Warping (DTW) and a text-independent algorithm known as vector quantization (VQ) have been shown to have correlation of r=0.74.

Figure 2:
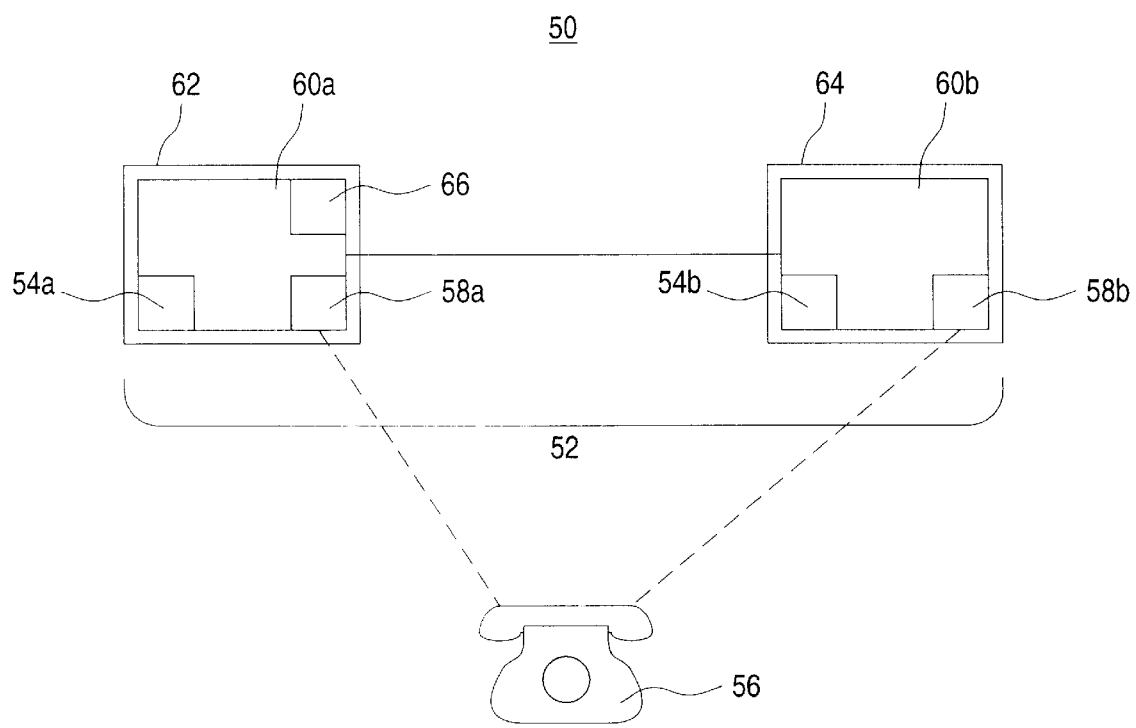
FIG. 2 is a block diagram demonstrating a system for establishing a positive or negative identity of a speaker according to the present invention.

With reference now to FIG. 2, presented is a system for establishing an identity of a speaker according to the present invention, which is referred to hereinbelow as system 50.

Thus, system 50 includes a computerized system 52, which includes at least two voice authentication algorithms 54, two are shown and are marked 54a and 54b.

Algorithms 54 are selected different from one another, and each serves for independently analyzing a voice of the speaker, for obtaining an independent positive or negative authentication of the voice by each. If every one of algorithms 54 provide a positive authentication, the speaker is positively identified, whereas, if at least one of algorithms 54 provides negative authentication, the speaker is negatively identified (i.e., identified as an impostor).

Both text-dependent and text-independent voice authentication algorithms may be employed. Examples include feature extraction followed by pattern matching algorithms, as described, for example, in U.S. Pat. No. 5,666,466, neural network voice authentication algorithms, as described, for example, in U.S. Pat. No. 5,461,697, Dynamic Time Warping (DTW) algorithm, as described, for example, in U.S. Pat. No. 5,625,747, Hidden Markov Model (HMM) algorithm, as described, for example, in U.S. Pat. No. 5,526,465, and vector quantization (VQ) algorithm, as described, for example, in U.S. Pat. No. 5,640,490. All patents cited are incorporated by reference as if fully set forth herein.

According to a preferred embodiment of the present invention a false rejection threshold of each of algorithms 54 is set to a level below or equals 0.5%, preferably below or equals 0.4%, more preferably below or equals 0.3%, most preferably below or equals 0.2% or equals about 0.1%.

Depending on the application, the voice of the speaker may be directly accepted by system 52, alternatively the voice of the speaker may be accepted by system 52 via a remote communication mode.

Thus, according to a preferred embodiment, the voice of the speaker is accepted for analysis by computerized system 52 via a remote communication mode 56. Remote communication mode 56 may, for example, be wire or cellular telephone communication modes, computer phone communication mode (e.g., Internet or Intranet) or a radio communication mode. These communication modes are symbolized in FIG. 2 by a universal telephone symbol, which is communicating, as indicated by the broken lines, with at least one receiver 58 (two are shown, indicated 58a and 58b) implemented in computerized system 52.

According to yet another preferred embodiment of the present invention, computerized system 52 includes at least two hardware installations 60 (two, 60a and 60b, are shown), each of installations 60 serves for actuating one of voice authentication algorithms 54. Hardware installations 60 may be of any type, including, but not limited to, a personal computer (PC) platform or an equivalent, a dedicated board in a computer, etc. Hardware installations 60 may be remote from one another. As used herein "remote" refers to a situation wherein installations 60 communicate thereamongst via a remote communication medium.

In one application of the present invention at least one of hardware installations 60, say 60a, is implemented in a secured-system 62, whereas at least another one of hardware installations 60, say 60b, is implemented in a securing-center 64. In a preferred embodiment hardware installation 60b which is implemented in securing-center 64 communicates with hardware installation 60a which implemented in secured-system 62, such that all positive or negative identification data of the speaker is eventually established in secured-system 62.

The term "securing-center" as used herein in the specification and in the claims section below refers to computer system which serves for actuating at least one voice authentication algorithm, and therefore serves part of the process of positively or negatively identifying the speaker.

According to a preferred embodiment of the invention, computerized system 52 further includes a voice recognition algorithm 66. Algorithm 66 serves for recognizing verbal data spoken by the speaker (as opposed to identifying the speaker by his voice utterance) and thereby to operate secured-system 62. Algorithm 66 preferably further serves for positively or negatively recognizing the verbal data, and if the positive identity has been established via algorithms 54, as described above, positively or negatively correlating between at least some of the verbal data and the authenticated speaker, where only if such correlation is positive, the speaker gains access to secured-system 66.

The verbal data spoken by the speaker may include any spoken phrase (at least one word), such as, but not limited to, a name, an identification number, and a request.

In a preferred embodiment of the invention a single security-center 64 having one voice authentication algorithm 54 implemented therein communicates with a plurality of secured-systems 62, each of which having a different (second) voice authentication algorithm 54, such that a speaker can choose to access any one or a subset of the plurality of secured-systems 62 if authenticated.

EXAMPLE

Reference is now made to the following example, which together with the above descriptions, illustrate the invention in a non limiting fashion.

FIGS. 3–6 describe a preferred embodiment of the system and method according to the present invention.

Figure 3:
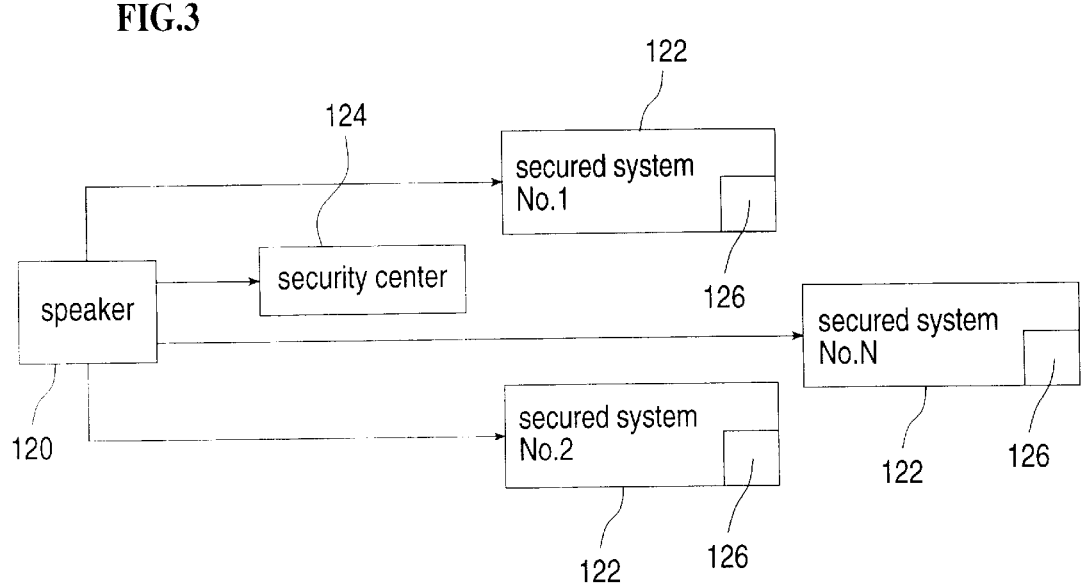
FIG. 3 is a black box diagram of a system according to the present invention, showing the relations between the speaker the security center and several secured systems according to the present invention.

Thus, as shown in FIG. 3, using his voice alone or in combination with a communication device, such as, but not limited to, a wire telephone, a cellular wireless telephone, a computer phone, a transmitter (e.g., radio transmitter), or any other remote communication medium, a user, such as speaker 120, communicates with a security-center 124 and one or more secured-systems 122, such as, but not limited to, a computer network (secured-system No. 1), a voice mail system (secured-system No. 2) and/or a bank's computer system (secured-system No. N).

In a preferred embodiment the speaker uses a telephone communication mode, whereas all secured-systems 122 and security-center 124 have an identical telephone number, or the same frequency and modulation in case radio communication mode is employed. In any case, preferably the user simultaneously communicates with secured-systems 122 and security-center 124. In a preferred embodiment of the invention, for the purpose of the voice verification or authentication procedure, each of secured-systems 122 includes only a receiver 126, yet is devoid of a transmitter.

Figure 4:
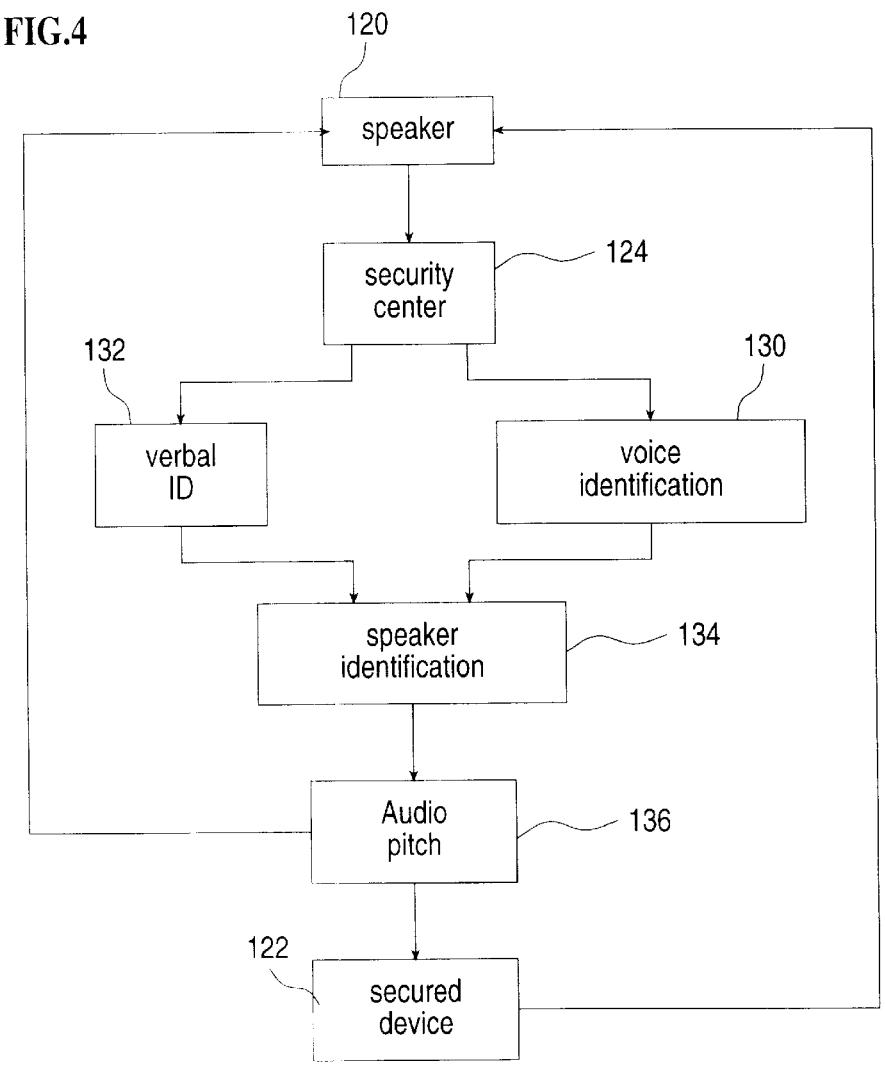
FIG. 4 is a black box diagram showing the process of voice analysis in the security center according to an embodiment of the present invention.

FIG. 4 described the next step in the process. Security-center 124 performs a voice analysis of the incoming voice, using, for example, (i) any prior art algorithm of voice authentication 130 and (ii) a conventional verbal recognition algorithm 132 which includes, for example, verbal identification of the required secured-system 122 (No. 1, 2, . . . , or N) access code (which also forms a request), a password and the social security number of speaker 120. The false rejection threshold is set to a low level, say, below 0.5%, preferably about 0.3%, which renders the false acceptance level in the order of 4.6%.

After positive identification of the incoming voice is established, security-center 124 acknowledges the speaker identification 134 by, for example, transmitting an audio pitch 136. Audio pitch 136 is received both by speaker 120 and by the specific secured-system 122 (e.g., according to the system access code used by speaker 120).

Figure 5:
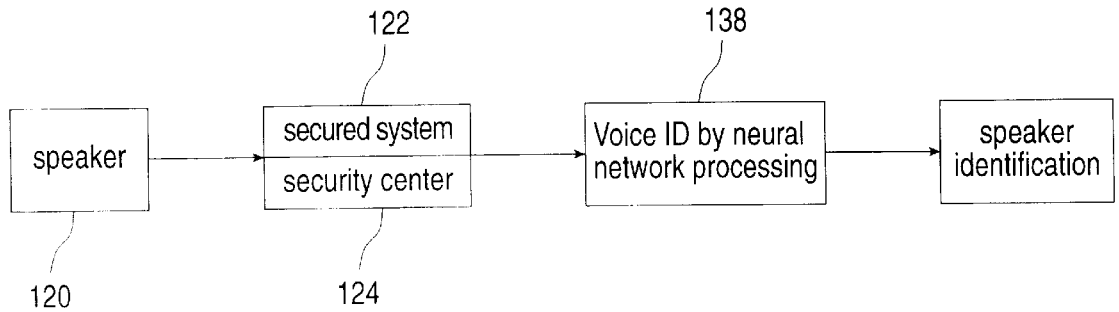
FIG. 5 is a black box diagram showing the process of a second voice analysis according to an embodiment of the present invention.

FIG. 5 describes what follows. Security-center 124, or preferably secured-system 122, performs voice authentication of the incoming voice using a second voice authentication algorithm 138, which is different from voice authentication algorithm 130 used by security-center 124, as described above with respect to FIG. 4.

For example, voice authentication algorithm 138 may be a neural network voice authentication algorithm, as, for example, described in U.S. Pat. No. 5,461,697.

Again, the false rejection threshold is set to a low level, say below 0.5%, preferably 0.3 or 0.1%. Following the above rational and calculations, as a result, for algorithms having EER value of about 2%, the false acceptance level (e.g., for 0.3%) falls in the order of 4.6%.

In a preferred embodiment of the invention security-center 124 and secured-system 122 are physically removed. Since the process of identification in security-center 124 prolongs some pre-selected time interval, activation of the simultaneous voice verification in secured-system 122 occurs at $t=\Delta T$ after the receipt of audio pitch 136 at secured-system 122. This time delay ensures that no identification will occur before the acknowledgment from security-center 122 has been received.

Figure 6:
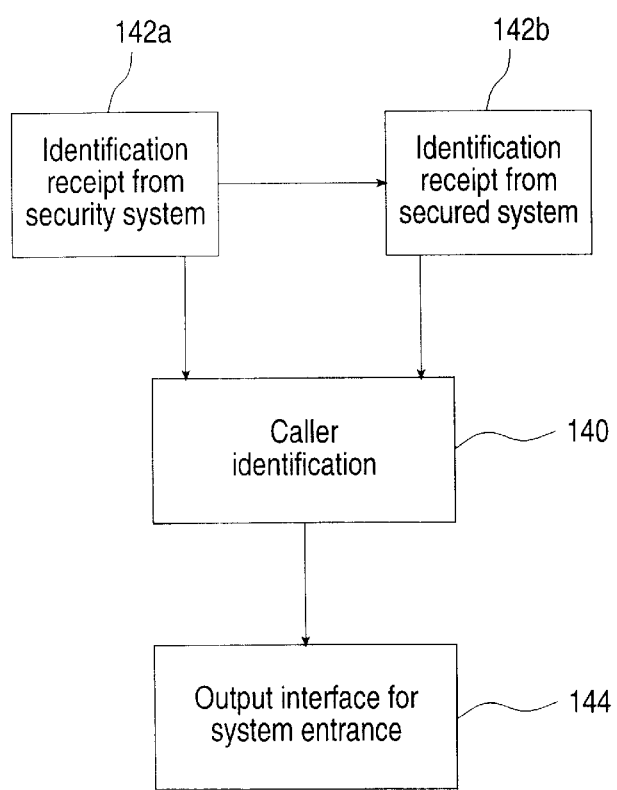
FIG. 6 is a black box diagram showing the process of establishing final speaker identification according to an embodiment of the present invention.

As shown in FIG. 6, final speaker identification 140 is established only when identification 142a and 142b is established by both security system 124 and secured-system 122, which results in accessibility of the speaker to secured-system 122.

Thus, only if both security-center 124 and secured-system 122 have established positive voice verification, the speaker has been positively identified and the process has been positively completed and access to secured-system 122 is, therefore, allowed, as indicated by 144.

If one of the systems 122 and 124 fails to verify the speaker's voice, the process has not been positively completed and access to secured-system 122 is, therefore, denied.

While the invention has been described with respect to a limited number of embodiments, it will be appreciated that many variations, modifications and other applications of the invention may be made.

What is claimed is:

1. A method for establishing an identity of a speaker comprising the steps of:

(a) providing a computerized system including at least two hardware installations employing at least two voice authentication algorithms, each of said at least two voice authentication algorithms being different from one another, each of said at least two hardware installations being for actuating one of said at least two voice authentication algorithms; and (b) independently analyzing a voice of the speaker by each of said at least two voice authentication algorithms for obtaining an independent positive or negative authentication of the voice by each of said at least two algorithms;

wherein if every one of said at least two voice authentication algorithms provide a positive authentication, the speaker is positively identified, whereas, if at least one of said at least two voice authentication algorithms provides negative authentication, the speaker is negatively identified, whereas at least one of said at least two hardware installations is implemented in a secured-system, and at least another one of said at least two hardware installations is implemented in a securing-center, said at least one hardware installation implemented in said securing-center communicates with said at least one hardware installation implemented in said secured-system, such that all positive or negative identification data is established in said secured-system.

2. The method of claim 1, wherein each of said voice authentication algorithms is independently selected from the group consisting of text-dependent algorithms and text-independent algorithms.

3. The method of claim 2, wherein each of said voice authentication algorithms is independently selected from the group consisting of feature extraction followed by pattern matching algorithms, neural network voice authentication algorithms, Dynamic Time Warping algorithm, Hidden Markov Model algorithm and vector quantization algorithm.

4. The method of claim 1, wherein a false rejection threshold of each of said at least two algorithms is set to a level below 0.5%.

5. The method of claim 4, wherein said false rejection threshold of each of said at least two algorithms is set to about 0.3%.

6. The method of claim 1, wherein the voice of the speaker is accepted for analysis by said computerized system via a remote communication mode.

7. The method of claim 6, wherein said remote communication mode is selected from the group consisting of wire telephone communication, cellular telephone communication, computer phone communication and radio communication.

8. The method of claim 1, wherein said at least two hardware installations are remote from one another.

9. The method of claim 1, wherein said computerized system further includes a voice recognition algorithm for recognizing verbal data spoken by said speaker.

10. The method of claim 9, wherein said verbal data includes a spoken phrase selected from the group consisting of a name, an identification number, and a request.

11. The method of claim 1, wherein said computerized system further includes a voice recognition algorithm for recognizing verbal data spoken by said speaker, the method further comprising the steps of positively or negatively recognizing said verbal data, and if said positive identity has been established, positively or negatively correlating between at least some of said verbal data and said speaker.

12. A method for establishing an identity of a speaker comprising the steps of:

(a) providing a computerized system employing at least two voice authentication algorithms, each of said at least two voice authentication algorithms being different from one another; and (b) independently analyzing a voice of the speaker by each of said at least two voice authentication algorithms for obtaining an independent positive or negative authentication of the voice by each of said at least two algorithms;

wherein if every one of said at least two voice authentication algorithms provide a positive authentication, the speaker is positively identified, whereas, if at least one of said at least two voice authentication algorithms provides negative authentication, the speaker is negatively identified, whereas said at least two voice authentication algorithms include a first voice authentication algorithm and a plurality of identical second voice authentication algorithms, said first voice authentication algorithm is implemented in a security-center, whereas said plurality of second voice authentication algorithms are implemented in a plurality of secured-systems, said security-center communicates with each of said plurality of secured-systems.

13. A system for establishing an identity of a speaker comprising a computerized system including at least two hardware installations for actuating at least two voice authentication algorithms, each of said at least two hardware installations serves for actuating one of said at least two voice authentication algorithms, each of said at least two voice authentication algorithms being different from one another and serving for independently analyzing a voice of the speaker for obtaining an independent positive or negative authentication of the voice by each of said at least two algorithms, wherein if every one of said at least two voice authentication algorithms provide a positive authentication, the speaker is positively identified, whereas, if at least one of said at least two voice authentication algorithms provides negative authentication, the speaker is negatively identified, at least one of said at least two hardware installations is implemented in a secured-system, and at least another one of said at least two hardware installations is implemented in a securing-center, said at least one hardware installation implemented in said securing-center communicates with said at least one hardware installation implemented in said secured-system, such that all positive or negative identification data is established in said secured-system.

14. The method of claim 13, wherein each of said voice authentication algorithms is independently selected from the group consisting of text-dependent algorithms and text-independent algorithms.

15. The method of claim 14, wherein each of said voice authentication algorithms is independently selected from the group consisting of feature extraction followed by pattern matching algorithms, neural network voice authentication algorithms, Dynamic Time Warping algorithm, Hidden Markov Model algorithm and vector quantization algorithm.

16. The system of claim 13, wherein a false rejection threshold of each of said at least two algorithms is set to a level below 0.5%.

17. The system of claim 16, wherein said false rejection threshold of each of said at least two algorithms is set to about 0.3%.

18. The system of claim 13, wherein the voice of the speaker is accepted for analysis by said computerized system via a remote communication mode.

19. The system of claim 18, wherein said remote communication mode is selected from the group consisting of wire telephone communication, cellular telephone communication, computer phone communication and radio communication.

20. The system of claim 13, wherein said at least two hardware installations are remote from one another.

21. The system of claim 13, wherein said computerized system further includes a voice recognition algorithm for recognizing verbal data spoken by said speaker.

22. The system of claim 13, wherein said computerized system further includes a voice recognition algorithm for recognizing verbal data spoken by said speaker for positively or negatively recognizing said verbal data, and if said positive identity has been established, positively or negatively correlating between at least some of said verbal data and said speaker.

23. The system of claim 22, wherein said verbal data includes a spoken phrase selected from the group consisting of a name, an identification number, and a request.

24. A system for establishing an identity of a speaker comprising a computerized system including at least two voice authentication algorithms, each of said at least two voice authentication algorithms being different from one another and serving for independently analyzing a voice of the speaker for obtaining an independent positive or negative authentication of the voice by each of said at least two algorithms, wherein if every one of said at least two voice authentication algorithms provide a positive authentication, the speaker is positively identified, whereas, if at least one of said at least two voice authentication algorithms provides negative authentication, the speaker is negatively identified, said at least two voice authentication algorithms include a first voice authentication algorithm and a plurality of identical second voice authentication algorithms, said first voice authentication algorithm is implemented in a security-center, whereas said plurality of second voice authentication algorithms are implemented in a plurality of secured-systems, said security-center communicates with each of said plurality of secured-systems.

* * * * *